United States Patent
Khandelwal et al.

(12) United States Patent (10) Patent No.: US 8,484,431 B1
(45) Date of Patent: Jul. 9, 2013

(54) METHOD AND APPARATUS FOR SYNCHRONIZING A PHYSICAL MACHINE WITH A VIRTUAL MACHINE WHILE THE VIRTUAL MACHINE IS OPERATIONAL

(75) Inventors: Atul Khandelwal, Maharashtra (IN); Anurag Runthala, Rajasthan (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/442,070

(22) Filed: Apr. 9, 2012

Related U.S. Application Data (63) Continuation of application No. 12/465,614, filed on May 13, 2009, now Pat. No. 8,156,301.

(51) Int. Cl.
*G06F 12/00* (2006.01)
*G06F 9/455* (2006.01)

(52) U.S. Cl.
CPC .................................. *G06F 9/45533* (2013.01)
USPC ........... 711/170; 711/112; 711/154; 711/146; 711/144

(58) Field of Classification Search
CPC ................ G06F 9/45533; G06F 9/4426; G06F 11/0748; G06F 11/2294; G06F 17/30902; G06F 2009/45579
USPC .......................... 711/112, 154, E12.014, 170
See application file for complete search history.

(56) References Cited

U.S. PATENT DOCUMENTS 7,694,189 B2 * 4/2010 Van Riel et al. ............. 714/47.1

* cited by examiner

*Primary Examiner* — Thong Q Le
(74) *Attorney, Agent, or Firm* — Campbell Stephenson LLP (57) ABSTRACT

A method for synchronizing, using at least one processor, a physical machine with a virtual machine while the virtual machine is operational in memory is disclosed. In one embodiment, the method includes monitoring a physical machine that utilizes a physical disk for storing computer data, consolidating a virtual disk with modifications to the physical disk, wherein the modifications to the physical disk are replicated on the virtual disk in response to unavailability of the physical machine, operating a virtual machine that utilizes the virtual disk for storing the computer data and migrating the virtual machine, using the virtual disk, to a computer.

20 Claims, 5 Drawing Sheets

METHOD AND APPARATUS FOR SYNCHRONIZING A PHYSICAL MACHINE WITH A VIRTUAL MACHINE WHILE THE VIRTUAL MACHINE IS OPERATIONAL

CROSS-REFERENCE TO RELATED APPLICATIONS

This application is a continuation of U.S. patent application Ser. No. 12/465,614, entitled "METHOD AND APPARATUS FOR SYNCHRONIZING A PHYSICAL MACHINE WITH A VIRTUAL MACHINE WHILE THE VIRTUAL MACHINE IS OPERATIONAL", filed May 13, 2009 now U.S. Pat. No. 8,156,301, naming Atul Khandelwal and Anurag Runthala as inventors. This application is assigned to Symantec Corporation, the assignee of the present invention, and is hereby incorporated by reference, in its entirety and for all purposes.

BACKGROUND

1. Field of the Invention

Embodiments of the present invention generally relate to computer resource management systems and, more particularly, to a method and apparatus for synchronizing a physical machine with a virtual machine while the virtual machine is operational.

2. Description of the Related Art

In a typical computing environment, small to large organizations produce a significant amount of mission critical data (e.g., financial information, trade secrets, legal documents, intellectual property, critical business strategies (e.g., marketing and/or production plans), source code, presentations and/or the like). These organizations may employ various computing technologies to protect and process the mission critical data such that various users may process such mission critical data with little or no interruption. For example, an employee may utilize a physical machine (e.g., a computer, such as a desktop, a laptop, a PDA and/or the like) to perform various tasks (e.g., billing, payroll and/or the like) and any data loss or interruption may result in downtime.

Physical machines, however, may become inoperable (e.g., system crash) due to various failures (e.g., a hardware failure, a software fault, an operating system failure and/or the like). These failures often cause disastrous errors and/or data loss. For example, a sudden computer crash may occur while a user is testing source code. As another example, the user may be demonstrating proprietary software to a potential customer or investor when the physical machine fails to boot and jeopardizes future business relations.

Various data recovery software programs may be utilized to restore a software and/or hardware configuration of the physical machine upon recovery after a failure. Unfortunately, these data recovery software programs require a significant amount of time to complete the restoration process. The user may also require an administrator to manually restore the physical machine. Even after the physical machine is restored, the user is required to reinstall applications and reconfigure hardware devices on the restored physical machine.

These data recovery software programs may configure a virtual machine to be a clone of the physical machine. Furthermore, the virtual machine may use the same computer data as the physical machine. As such, the user may operate the virtual machine in a manner similar to the physical machine. The virtual machine, unfortunately, must be powered off in order to recover the physical machine at a later point-in-time.

Therefore, there is a need in the art for a method and apparatus for synchronizing a physical machine with a virtual machine while the virtual machine is operational.

SUMMARY OF THE INVENTION

Embodiments of the present disclosure generally include a method and apparatus for synchronizing a physical machine with a virtual machine while the virtual machine is operational. In one embodiment, the method for synchronizing, using at least one processor, a physical machine with a virtual machine while the virtual machine is operational in memory is provided. The method includes monitoring a physical machine that utilizes a physical disk for storing computer data consolidating a virtual disk with modifications to the physical disk, wherein the modifications to the physical disk are replicated on the virtual disk in response to unavailability of the physical machine, operating a virtual machine that utilizes the virtual disk for storing the computer data and migrating the virtual machine, using the virtual disk, to a computer.

In some embodiments, the virtual machine may be migrated to the physical machine when the physical machine is available. In some embodiments, modifications to the virtual disk may be replicated on the physical disk. In some embodiments, delta modifications associated with the virtual disk may be replayed onto the physical disk. In some embodiments, heartbeat data from the physical machine may be processed. In some embodiments, the heartbeat data may indicates availability of the physical machine. In some embodiments, availability of the physical machine may be assessed. In some embodiments, changed data information may be generated that indicates at least one changed data block within at least one of the physical disk or the virtual disk. In some embodiments, the physical disk may be restored to a current state associated with the virtual disk. In some embodiments, a virtual machine image may be converted into a bootable virtual disk for recovering the physical machine. In some embodiments, the physical machine may be recovered using a bootable virtual disk. In some embodiments, the virtual disk may be transformed into a bootable virtual disk.

In another embodiment, an apparatus for synchronizing, using at least one processor, a physical machine with a virtual machine while the virtual machine is operational in memory is provided. The apparatus includes means for monitoring a physical machine that utilizes a physical disk for storing computer data, means for replicating, on a virtual disk, modifications to the physical disk and generating a virtual machine that utilizes the virtual disk for storing the computer data when the physical machine is unavailable and means for operating a virtual machine that utilizes the virtual disk for storing the computer data and migrating the virtual machine to the physical machine, wherein modifications to the virtual disk are replicated on the physical disk.

In some embodiments, the apparatus further includes means for transforming the virtual disk into a bootable virtual disk. In some embodiments, the apparatus further includes means for converting a virtual machine image into a bootable virtual disk for recovering the physical machine. In some embodiments, the apparatus further includes means for restoring the physical disk to a current state associated with the virtual disk.

In yet another embodiment, a computer-readable-storage medium is provided. The computer-readable-storage medium comprises one or more executable instructions that, when executed by at least one processor, causes the at least one processor to monitor a physical machine that utilizes a physical disk for storing computer data, to consolidate modifications to the physical disk with a virtual disk, wherein the modifications to the physical disk are replicated on the virtual disk, to operate a virtual machine that utilizes the virtual disk for storing the computer data in response to unavailability of the physical machine and to migrate the virtual machine to the physical machine, wherein modifications to the virtual disk are replicated on the physical disk.

In some embodiments, the one or more processor-executable instructions may transform the virtual disk into a bootable virtual disk. In some embodiments, the one or more processor-executable instructions may replicate, on the physical disk, delta modifications to the virtual disk. In some embodiments, the one or more processor-executable instructions may convert a virtual machine image into a bootable virtual disk for recovering the physical machine.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained in detail below, various embodiments of the present disclosure enables synchronization of a physical machine with a virtual machine while the virtual machine is operational. As computer users operate the physical machine and process computer data stored within a physical disk, a consolidation module may be executed to maintain, on a virtual disk, a current state of the computer data within the physical disk. The consolidation module cooperates with various software modules to create a virtual machine for performing computer operations on the virtual disk and communicating with these computer users through a Remote Desktop Connection. After a hardware failure or software fault, the physical machine becomes unavailable and the consolidation module instructs a virtualization module to operate the virtual machine such that these computer users may continue processing the computer data with minimal or no interruption and/or data loss.

When the physical machine returns to functionality and becomes available, these software modules may cooperate to recover the physical machine. In some embodiments, the consolidation module cooperates with the virtualization module to produce a bootable virtual disk (e.g., a bootable .VHD file) that includes the virtual disk as well as various software programs (e.g., device drivers, operating system programs, application software and/or the like) to be installed on the physical machine. In some embodiments, a consolidation module may instruct a recovery module to restore the current state of the physical disk using the virtual disk.

Figure 1:
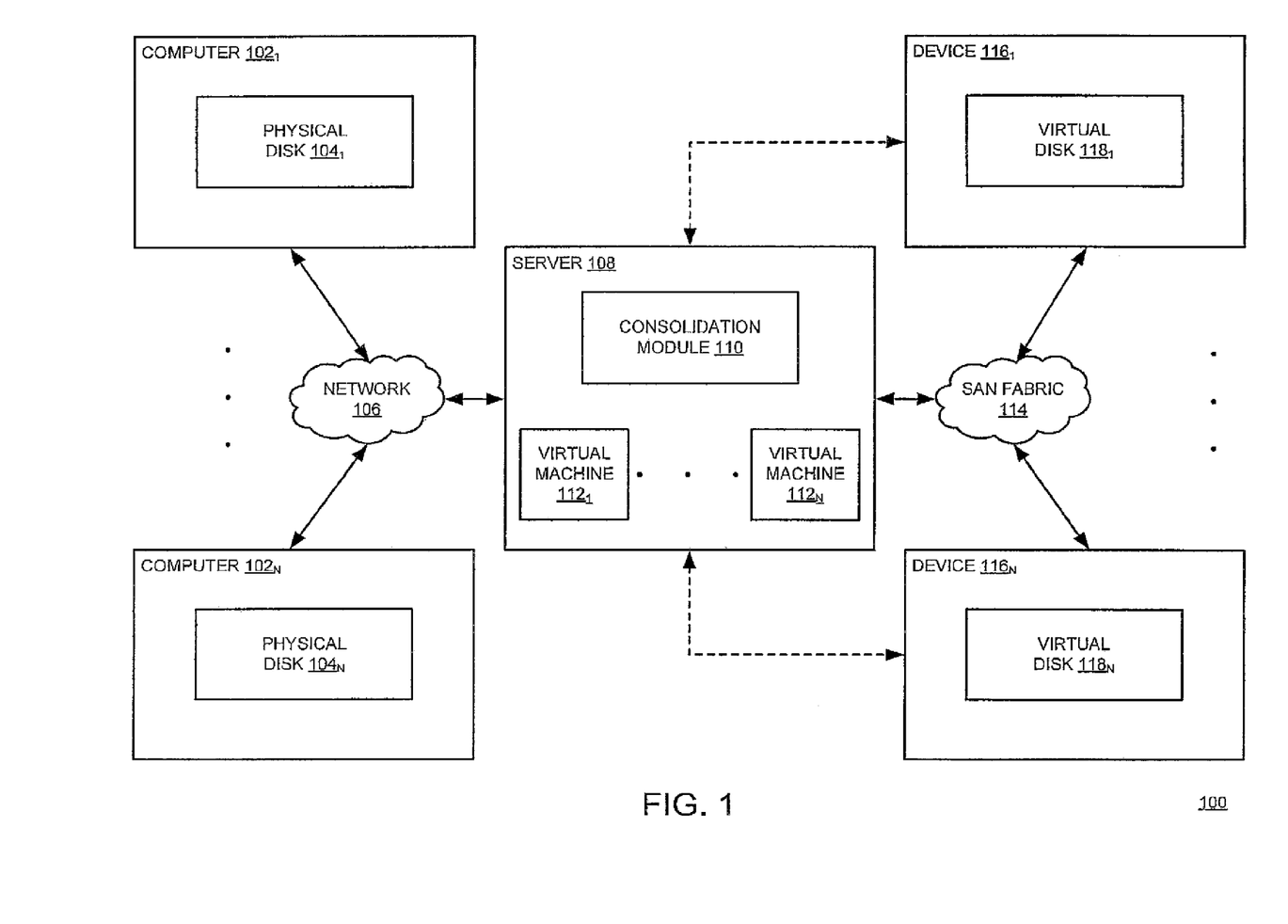
FIG. 1 is a block diagram of a system for synchronizing a physical machine with a virtual machine while the virtual machine is operational, according to one or more embodiments.

FIG. 1 is a block diagram of a system 100 for synchronizing a physical machine with a virtual machine while the virtual machine is operational according to one embodiment. The system 100 may form a computing environment that comprises a server 108 and a plurality of computers 102, where each is coupled to one another through a network 106. Furthermore, the system 100 comprises a plurality of devices 116, where each of the plurality of devices 116 is coupled to the server 108 through a Storage Area Network (SAN) fabric 114.

Generally, each of the plurality of computers 102 may be a type of computing device (e.g., a laptop, a desktop, a terminal and/or the like) that facilitates operation of various applications for one or more computer users. For example, the plurality of computers 102 may include a laptop through which a salesperson may send emails to customers. If the laptop crashed, the salesperson may continue sending emails using a virtual machine hosted by the server 108 as explained further below.

Each of the plurality of computers 102 includes a physical disk 104, which facilitates persistent storage of computer data. One or more users may utilize the computer 102 to perform various computer operations (e.g., file system and/or storage operations) that modify the physical disk 104 through various software applications. For example, a user may create a file (e.g., an MS WORD file and/or the like) and/or add and/or change one or more data blocks to an existing file. The one or more changed data blocks are stored on the physical disk 104. As explained further below, modifications to the physical disk 104 are replicated to the virtual disk 118 by a data change module.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure such as Ethernet, WiFi, WiMax, General Packet Radio Service (GPRS), and the like.

The server 108 may be a type of computing device (e.g., a laptop, a desktop, a server class machine and/or the like) known to one of ordinary skill in the art having the benefit of this disclosure. The server 108, generally, provides various services (e.g., application services, storage services and/or the like) to the plurality of computers 102 within the system 100. The server 108 includes a consolidation module 110. The server hosts a plurality of virtual machines 112 to the plurality of computers 102. As explained in detail further below, each virtual machine 112 may be an instance of a virtual machine image.

The server 108 may couple with the plurality of devices 116 through the Storage Area Network (SAN) fabric 114 and provide the plurality of computers 102 with access to various storage resources. The SAN fabric 114 comprises various communications infrastructure, such as Ethernet, Fibre Channel, InfiniBand, Internet Small Computer System Interface (iSCSI) and/or the like. As an example, such a Storage Area Network (SAN) fabric 114 may include Fibre Channel switches and/or iSCSI block storage devices.

The SAN fabric 114 and the plurality of devices 116 may form a type of a storage system that generally includes various components (i.e., hardware and software (not shown)) for managing storage resources. The plurality of devices 116 may include one or more data storage devices (e.g., hard disk drives, optical drives, magnetic tape drives, a storage array (e.g., a disk array in a RAID configuration) and/or the like). Each of the plurality of devices 116 may function through an interface (e.g., Integrated Drive Electronics/AT Attachment (IDE/ATA), Small Computer Systems Interface (SCSI) and/ or the like) with one or more computing devices (e.g., physical machines and/or virtual machines). The plurality of devices 116 facilitate persistent storage of the computer data in the form of one or more virtual disks 118 (i.e., one or more virtual disk files, such as a .VHD file or a .VMDK file) as explained further below.

The computer 102 may initiate a registration process with the server 108 such that various virtualization software modules may provision one or more virtual machines to facilitate uninterrupted operation of the computer data (e.g., a Physical to Virtual Conversion) as explained further below. The server 108 creates a virtual machine to which the user of the computer 102 may utilize to process the computer data within the virtual disk 118. Subsequently, the computer 102 may utilize various solutions (e.g., a heartbeat mechanism) to indicate availability. For example, the computer 102 may communicate heartbeat data at regular time intervals (e.g., one hour). If the server 108 fails to receive the heartbeat data at a scheduled point-in-time, the computer 102 most likely crashed.

After the computer 102 crashes (e.g., unavailability due to a hardware and/or a software failure), the user may utilize another computer 102 and operate the virtual machine 112 hosted by the server 108. Any subsequent operation initiated by the user is performed on the virtual disks 118. As the user operates the virtual machine 112, the consolidation module 110 maintains, on the virtual disks 118, a current state of the computer data within the physical disks 104. When the computer 102 is to be recovered, the virtual machine 112 may be migrated to a computer of the plurality of computers 102 as described further below.

Figure 2:
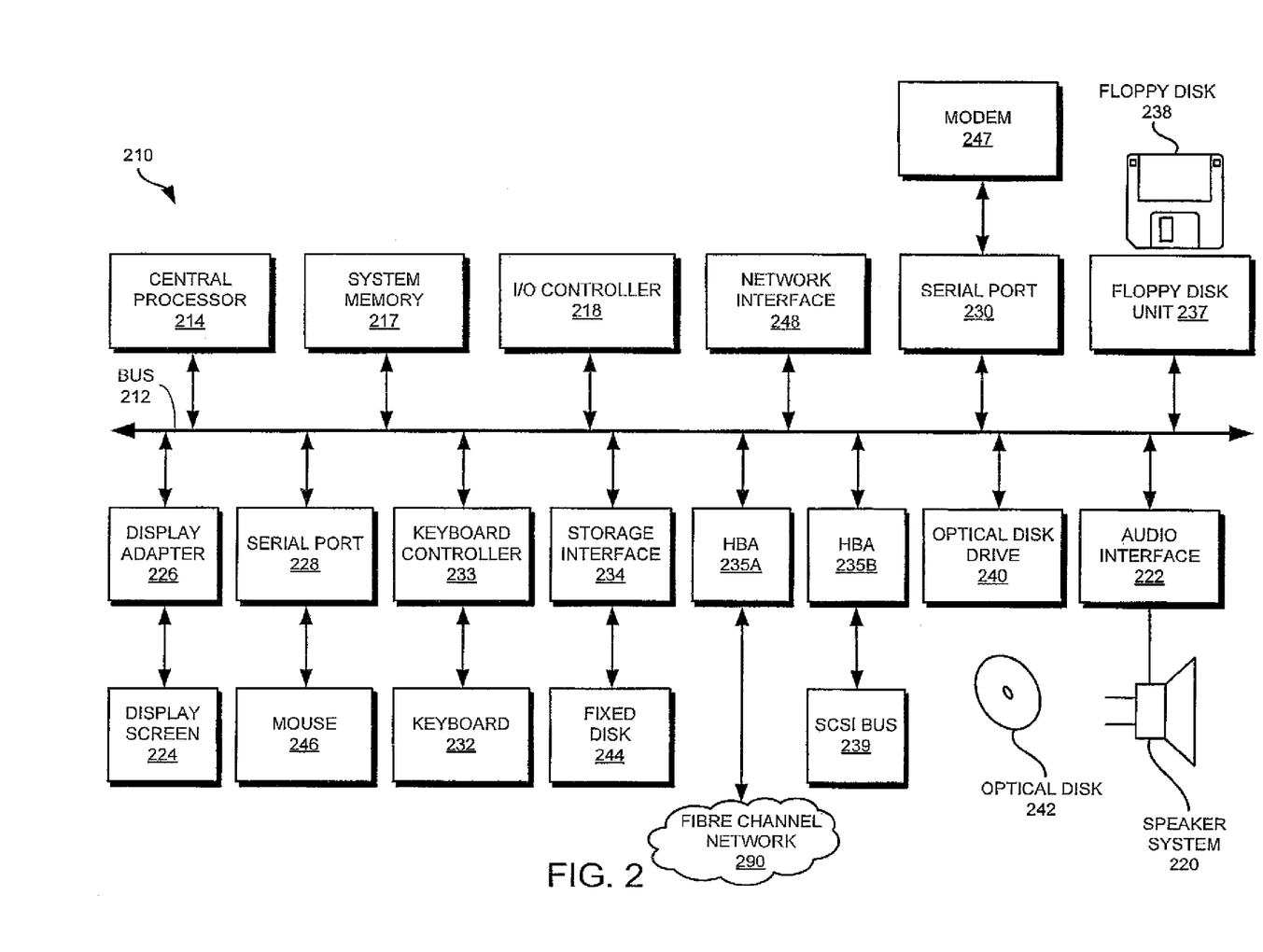
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 102 and/or the server 108 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical disk drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
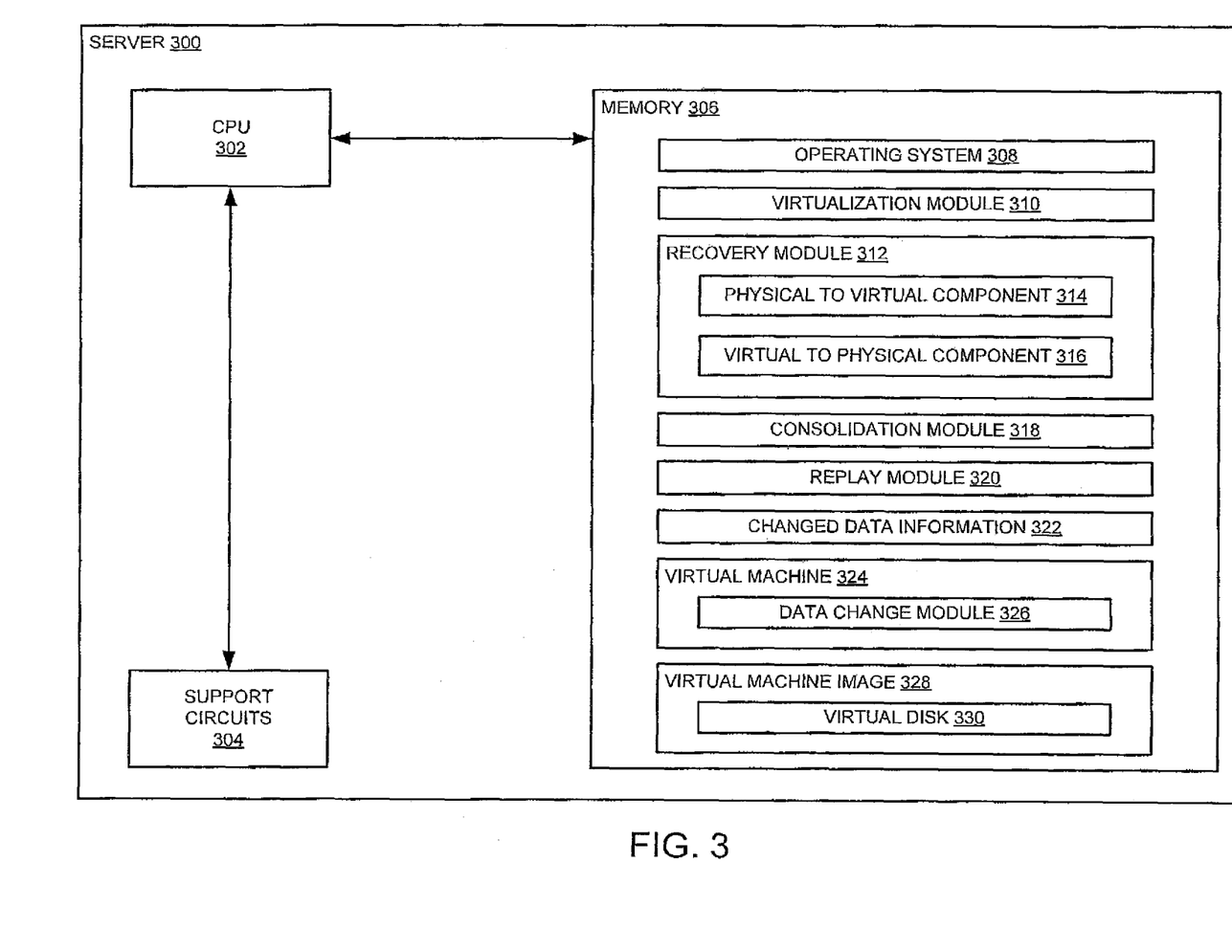
FIG. 3 is a block diagram of a server for synchronizing a physical machine with a virtual machine while the virtual machine is operational, according to one or more embodiments.

FIG. 3 is a block diagram of a server 300 for synchronizing a physical machine with a virtual machine while the virtual machine is operational according to one or more embodiments.

The server 300 is a type of computing device (e.g., a laptop, a desktop, a server class machine and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes various data and software packages, such as an operating system 308, virtualization software 310, a recovery module 312, a physical to virtual (P2V) component 314, a virtual to physical (V2P) component 316, a consolidation module 318, a replay module 320, changed data information 322. The memory 306 further includes a virtual machine 324, a data change module 326, a virtual machine image 328 and a virtual disk 330.

The operating system 308 generally manages various computer resources (e.g., network resources, data storage resources, file system resources and/or the like). The operating system 308 is configured to execute operations on one or more hardware and/or software components, such as network interface cards (NICs), hard disks, application processes, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the virtualization module 310 to execute various operations on the virtual disk 330. As an example, the operating system 308 may cooperate with the virtualization module 310 to process the virtual machine image 328 in order to operate the virtual machine 324 such that a user may continue processing computer data when a failure occurs at a computer (i.e., a physical machine).

The virtualization module 310 includes software code (e.g., processor executable instructions) that is executed by the CPU 302 to facilitate creation of a virtualization layer (e.g., a hypervisor) between the virtual machine 324 and local and/or remote computer resources (e.g., computer memory, physical processors, hard disks and/or the like) associated with the server 300 as well as any other networked storage devices (e.g., the plurality of devices 116 of FIG. 1). The virtualization layer multiplexes the local and/or remote computer resources to the virtual machine 324 running on the server 300 (e.g., the virtual machines 112 of FIG. 1). Through the virtualization layer, the virtual machine 324 may use the local computer resources on the server 300 as well as the remote computer resources on the networked storage devices. Thus, the virtualization layer generated by the virtualization software modules facilitates the necessary "virtual machine" abstraction. As shown further below, the recovery module 312 cooperates with the virtualization module 310 in order to create the virtual machine image 328 and run the virtual machine 324.

Operating the virtual machine 324 emulates a physical machine (e.g., the computer 102 of FIG. 1), which includes a physical disk (e.g., a physical hard disk drive) for storing computer data. The virtual machine 324 may be a runtime instance of the virtual machine image 328 that represents a hardware and/or software configuration associated with the physical machine. As such, the virtual machine 324 includes computer memory state information (e.g., file system logs, contents of working memory, cache memory and/or swap memory) as well as one or more running computer processes (e.g., guest operating system processes, application processes, device processes and/or the like). Furthermore, the virtual machine 324 includes the data change module 326 as explained in detail below.

The virtual machine image 328 may include various virtualization files (e.g., a .VMX file, a .VMDK file, a .VHD file and/or the like) that are utilized (e.g., mounted) by the virtualization module 310 (e.g., a Hypervisor, a Virtual Machine Monitor (VMM) and/or the like) to generate and monitor the virtual machine 324, which is abstract representations of the physical machine. In some embodiments, the virtual machine image 328 may represent a backup of the virtual machine 324. In some embodiments, the virtual machine image 328 may include a bootable virtual disk (e.g., a bootable virtual machine hard disk image (.VHD) file) for migrating the virtual machine 324 as explained further below.

The recovery module 312 includes software code (e.g., processor executable instructions) that may be executed by the CPU 302 to monitor and facilitate recovery of the physical machine (e.g., the physical machine 400 of FIG. 4) according to various embodiments. The recovery module 312 may employ various mechanisms to determine if the physical machine is available. For example, the recovery module 312 monitors heartbeat data communicated by the physical machine to assess availability. After a definable time period elapses, an absence of the heartbeat data indicates that the physical machine is unavailable. If the recovery module 312 determines that the physical machine is unavailable based on the heartbeat data, the recovery module 312 may initiate operation of the virtual machine 324, which uses the virtual disk 330 for storing the computer data. When the physical machine is to be recovered, the recovery module 312 may access the virtual disk 330 and restore the physical disk to a current state associated with the virtual disk 330. Alternatively, the recovery module 312 may restore another physical disk at another computer (e.g., another computer 102 of FIG. 1) to the current state associated with the virtual disk 330.

The recovery module 312 may include the physical to virtual (P2V) component 314 (e.g., VMWARE vCenter Converter). The physical to virtual (P2V) component 314 includes software code (e.g., processor executable instructions) that facilitates migration of the physical machine to the virtual machine. In some embodiments, the physical to virtual component 314 may convert the physical machine and the physical disk (e.g., a physical hard disk) into the virtual machine image 328 such that the computer data within the physical disk is stored within the virtual disk 330. For example, the P2V component 314 may create a bootable virtual disk having read/write privileges, such as a dynamic virtual hard disk image (.VHD) file including bootable operating system files.

The recovery module 312 may further include the virtual to physical (V2P) component 316 (e.g., VMWARE vCenter Converter). The V2P component 316 includes software code (e.g., processor executable instructions) that facilitates migration of the virtual machine 324 to the physical machine and/or any other computer. In order to perform the V2P migration, the V2P component 316 accesses (i.e. mounts) and converts the virtual machine image 328 that corresponds with the physical machine to be recovered according to some embodiments. For example, the V2P component 316 may convert the virtual machine image 328 into a bootable virtual disk that includes hardware boot information (e.g., a boot.ini file, a NTLDR process and/or the like), operating system boot information, device drivers, application installation files and/or the like associated with the physical machine to be recovered. In some embodiments, the V2P component 316 may transform the virtual disk 330 (e.g., a .VHD file) into the bootable virtual disk (e.g., a bootable .VHD file) for recovering the physical machine. The V2P component 316 mounts the bootable virtual disk to install the operating system, configure hardware devices and copy the computer data within the virtual disk 330 to the physical disk. In some embodiments, the physical machine runs hardware-specific files and starts an operating system from the bootable virtual disk.

The consolidation module 318 includes software code (e.g., processor executable instructions) that may be executed to enable synchronization of the physical machine (e.g., the computer 102 of FIG. 1) with the virtual machine 324 while the virtual machine 324 is operational. In some embodiments, the consolidation module 318 analyzes the changed data information 322, which may be communicated by the physical machine that utilizes the physical disk for storing computer data. In some embodiments, the consolidation module 318 utilizes the changed data information 322 to maintain, on the virtual disk 330, a current state of the computer data within the physical disk. In some embodiments, the consolidation module 318 cooperates with the replay module 320 to replicate computer data modifications between the physical disk and the virtual disk 330.

The replay module 320 includes software code (e.g., processor executable instructions) that may be executed to consolidate the virtual disk 330 with one or more modifications to the physical disk. In some embodiments, the consolidation module 318 calls the replay module 320 in order to replicate the one or more modifications on the virtual disk 330. For example, the consolidation module 318 communicates a data block and an extent to the replay module 320, which writes the data block to a portion of the virtual disk 330 that is identified by the extent.

While the physical machine is unavailable, the user may utilize another physical machine to communicate with the virtual machine 324. As an example, the other physical machine may connect with the server 300 as a remote desktop (e.g., a Remote Desktop Connection) in order to operate the virtual machine 324. Furthermore, the user may initiate execution of various guest operating system commands for modifying the computer data stored in the virtual disk 330. As the user operates the virtual machine 324, the virtualization module 310 performs one or more computer data modifications on the virtual disk 330.

Because the P2V component 314 created the virtual machine 324 as a clone of the physical machine, the data change module 326 and a data change module within the physical machine (e.g., the data change module 410 of FIG. 4) may operate identically or, at the very least, similarly. The data change module 326 monitors each and every modification performed on the virtual disk 330. For example, the data change module 326 examines one or more WRITE operations communicated to the virtual machine 324. The data change module 326 stores information (e.g., extents) associated with one or more changed data blocks within the virtual disk 330 as the changed data information 322.

In some embodiments, the recovery module 312 assesses the availability of the physical machine before instructing the virtual to physical component 316 to migrate the virtual machine 324. After the recovery module 312 calls the V2P component 316 to convert the virtual machine image 328 into a bootable virtual disk for recovering the physical machine, the recovery module 312 monitors the physical machine for heartbeat data. If the recovery module 312 receives heartbeat data indicating availability of the physical machine, the recovery module 312 instructs the virtualization software 310 to terminate the virtual machine 324 and/or unmount the virtual machine image 328.

In addition, the consolidation module 318 examines the changed data information 322 to identify one or more delta modifications (e.g., modifications to the virtual disk subsequent to the migration of the virtual machine 324 to the physical machine and before termination of the virtual machine 324). Once the one or more delta modifications are identified, the consolidation module 318 cooperates with a data change module running in the physical machine to replicate the one or more delta modifications such that the physical disk may be restored to a current state associated with the virtual disk 330 and the physical machine may be fully recovered on the computer.

Figure 4:
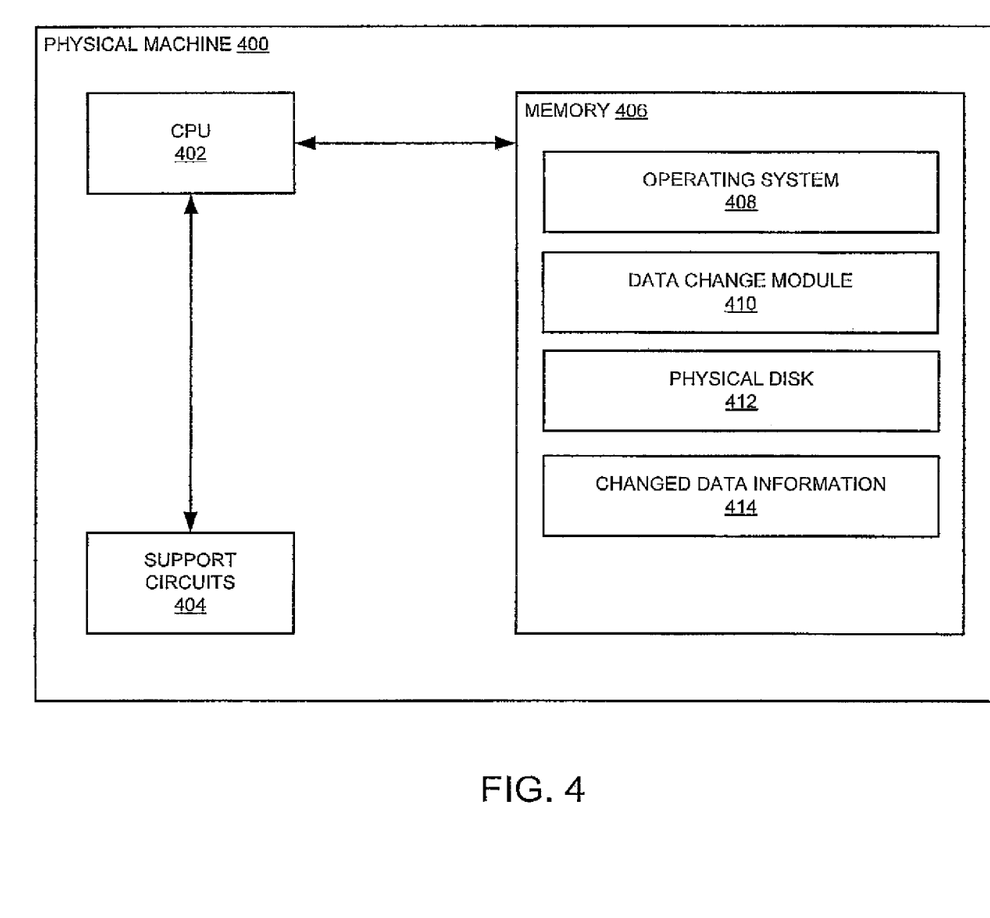
FIG. 4 is a block diagram of a physical machine, according to one or more embodiments.

FIG. 4 is a block diagram of a physical machine 400 according to one or more embodiments. The physical machine 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a read only memory, random access memory, disk drive storage, optical storage, removable storage, and the like. The memory 406 includes various data and software packages, such as an operating system 408, a data change module 410, a physical disk 412 and changed data information 414.

The operating system 408 generally manages various computer resources (e.g., network resources, data storage resources, file system resources and/or the like). The operating system 408 is configured to execute operations on one or more hardware and/or software components, such as network interface cards (NICs), hard disks, virtualization layers, firewalls and/or the like. For example, the various software packages call commands associated with the operating system 408 (i.e., native operating system commands) to perform, on the physical disk 412, various file system and/or storage operations, such as creating files or metadata, writing data to the files, reading data from the files, modifying metadata associated with the files and/or the like. The operating system 408 may call one or more functions to execute various file system and/or storage operations.

In one or more embodiments, the data change module 410 includes software code (e.g., processor executable instructions) that may be configured to monitor modifications to the physical disk 412 (e.g., the physical disk 104 of FIG. 1). As an example, the data change module 410 may cooperate with the operating system 408 to process one or more WRITE operations performed on the physical disk 412 and communicate information associated with such operations to another computer (e.g., the server 108 of FIG. 1 or the server 300 of FIG. 3). As explained further below, such information may identify one or more changed data blocks within the physical disk 412. In some embodiments, the data change module 410 creates the changed data information 414 to store locations (e.g., extents) associated with the one or more changed data blocks.

In some embodiments, the data change module 410 cooperates with a consolidation module (e.g., the consolidation module 318 of FIG. 3) to store such locations as changed data information (e.g., the changed data information 322 of FIG. 3) on the other computer (e.g., the server 300 of FIG. 3). For example, the data change module 410 may communicate the changed data information 414 to the other computer where the consolidation module parses the changed data information 414 to identify an extent (e.g., an offset from a first sector and a size (in bytes)) associated with a particular changed data block. As described in the present disclosure, the consolidation module instructs a replay module to perform, on a corresponding virtual disk, one or more file system operations for replicating the modifications to the physical disk 412. In some embodiments, the data change module 410 may communicate the changed data information 414 at a pre-defined time interval or a variable time interval. In some embodiments, the data change module 410 may continuously communicate the changed data information 414 to the consolidation module running within the other computer (e.g., the server 300).

In some embodiments, the changed data information 414 may further include one or more delta modifications, which may be applied to update the physical disk 412. In some embodiments, the data change module 410 processes information, communicated by the consolidation module, indicating one or more delta modifications to the corresponding virtual disk. The one or more delta modifications may identify one or more changed data blocks during a time period between a V2P conversion point-in-time and the virtual machine termination point-in-time. In some embodiments, the data change module 410 performs the one or more delta modifications on the physical disk 412 in order to recover the physical machine 400.

Figure 5:
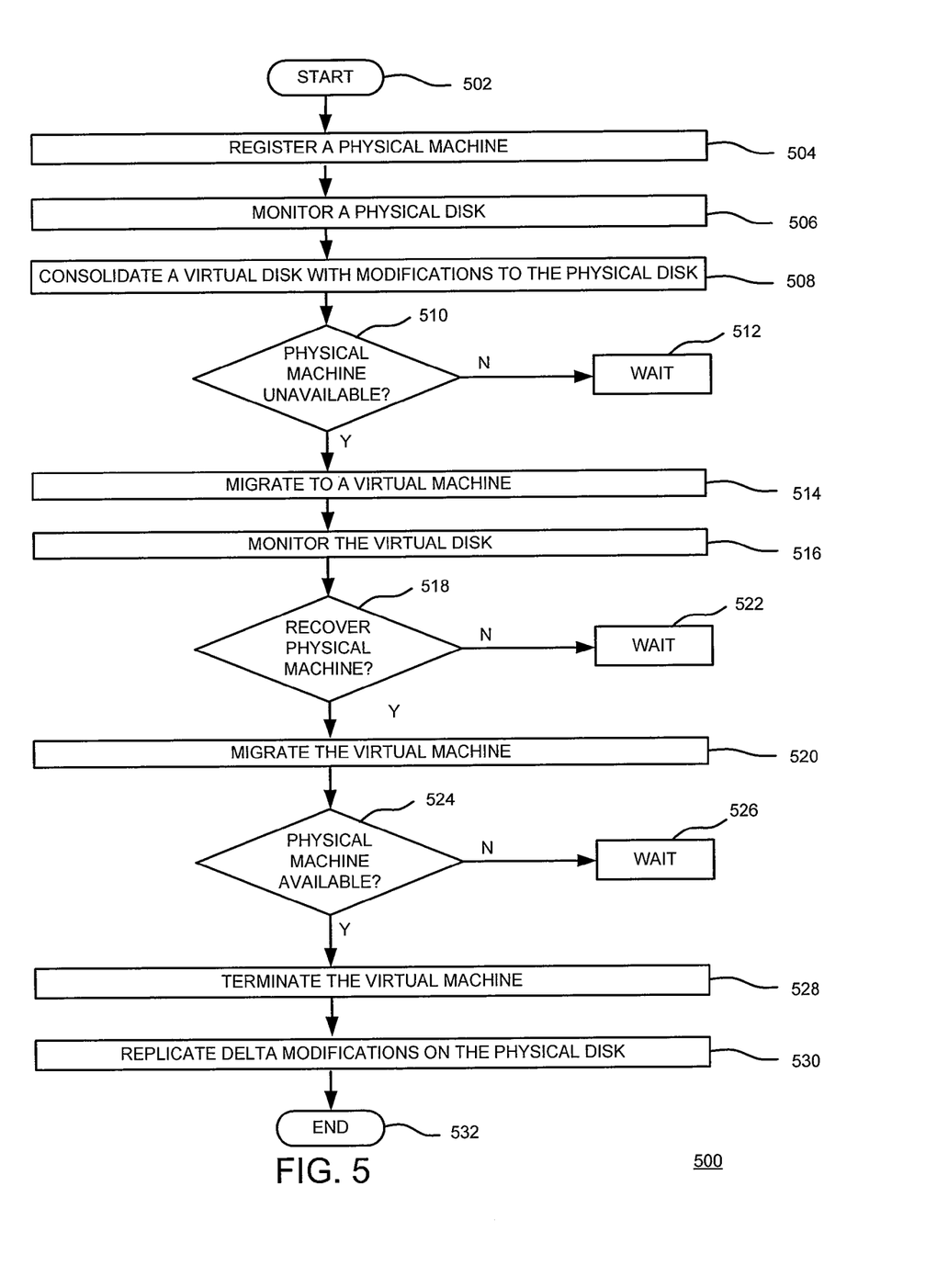
FIG. 5 is a flow diagram of a method for synchronizing a physical machine with a virtual machine while the virtual machine is operational, according to one or more embodiments.

FIG. 5 is a flow diagram of a method 500 for synchronizing a physical machine with a virtual machine while the virtual machine is operational according to one or more embodiments. In some embodiments, virtualization software modules (e.g., the virtualization module 310 of FIG. 3) in memory are executed by one or more processors to create and operate a virtualization layer as explained in the present disclosure. The virtualization software modules provide various virtualization functions for operating one or more virtual machines (e.g., the virtual machine 324 of FIG. 3 or the virtual machines 112 of FIG. 1), which are hosted by a server (e.g., the server 108 of FIG. 1) for a user of a computer (e.g., the computer 102 of FIG. 1). Furthermore, a data change module (e.g., the data change module 410 of FIG. 4) in the memory is executed by one or more processors to continuously or periodically monitor modified data blocks within one or more physical disks (e.g., the physical disks 104 of FIG. 1) and/or one or more virtual disks (e.g., the virtual disks 118 of FIG. 1).

The method 500 starts at step 502 proceeds to step 504. A consolidation module (e.g., the consolidation module 110 of FIG. 1 and the consolidation module 318 of FIG. 3) in the memory is executed by the one or more processors. At step 504, a physical machine (e.g., the physical machine 400 of FIG. 4) is registered. In one embodiment, the physical machine may register with the server (e.g., the server 108 of FIG. 1 and the server 300 of FIG. 3). The physical machine may utilize various available Application Programming Interfaces (API) and/or Command Line Interfaces (CLI) to request such a registration. In some embodiments, the physical machine may communicate a registration request to a recovery module (e.g., the recovery module 312 of FIG. 3), which calls a physical to virtual component to create a bootable virtual disk. Subsequently, the recovery module may monitor heartbeat data in order to determine a state associated with the physical machine (e.g., including but not limiting to powered on, powered down, available, unavailable and/or the like).

At step 506, a physical disk (e.g., the physical disk of FIG. 104) is monitored. In one embodiment, the data change module (e.g., the data change module 410 of FIG. 4) monitors the physical disk. For example, the data change module monitors each and every WRITE operation on the physical disk. Such operations are initiated by an operating system (e.g., the operating system 408 of FIG. 4) utilizing various operating system native commands (e.g., including but not limiting to WRITE, APPEND, FILE_CREATE and/or the like). The data change module may store locations associated with one or more changed data blocks as changed data information (e.g., the changed data information 414 of FIG. 4). In some embodiments, the data change module communicates the changed data information to a consolidation module (e.g., the consolidation module 318 of FIG. 3) running in the server.

At step 508, a virtual disk (e.g., the virtual disk 118 of FIG. 1) is consolidated with modifications to the physical disk. In some embodiments, the consolidation module cooperates with the data change module to aggregate information associated with one or more computer data modifications to the physical disk. For example, the consolidation module may combine two writes operations that overwrite each other into a single write operation to a particular extent within the virtual disk. Accordingly, the consolidation module modifies the changed data information to retain a latter changed block associated with the particular extent and remove a former changed block. The consolidation module may, using the one or more processors, execute a replay module (e.g., the replay module 320 of FIG. 3) in the memory (e.g., the memory 306 of FIG. 3) to perform the single write operation, which stores the later changed block at the particular extent within the virtual disk. Because the modifications to the physical disk are replicated on the virtual disk, the consolidation module maintains a current state of the computer data within the physical disk.

As a result, the recovery module may utilize the virtual disk as a copy or backup of the physical disk. If a file 'X' on the physical disk is modified in which one or more data blocks are appended, then the consolidation module may append the one or more data blocks to the file 'X' within the virtual disk. The consolidation module maintains a currents state associated with the file 'X' in the virtual disk. In some embodiments, one or more virtual volumes may form a portion (e.g., one or more partitions including but not limited to a boot partition, a system partition and/or the like) of the virtual disk (e.g., a virtual hard disk image, such as a .VHD).

In some embodiments, the consolidation module may instruct the recovery module to create the virtual disk as a clone of the physical disk. In some embodiments, the consolidation module may instruct the recovery module to transform the virtual disk into a bootable virtual disk for restoring the physical disk. In order to perform the migration of the virtual machine at a later point-in-time, the bootable virtual disk further includes various files for installing and running software programs (e.g., operating system processes, device drivers, application software and/or the like).

At step 510, a determination is made as to whether a physical machine is unavailable. In some embodiments, the recovery module processes heartbeat data communicated by the physical machine. In some embodiments, if the recovery module fails to receive a heartbeat after a pre-defined time period elapses, the physical machine may be unavailable due to one or more failures. For example, the physical machine may experience network connectivity problems because a Network Interface Card (NIC) failed to initialize. Hence, the physical machine cannot communicate the heartbeat and the recovery module determines that physical machine is unavailable. If the recovery module, on the other hand, receives the heartbeat after a regular time interval, the physical machine may be available and operational. If, it is determined that the physical machine is available (option "NO") then the method 500 proceeds to step 512. At step 512, the method 500 waits. In some embodiments, the consolidation module proceeds to replicate, on the virtual disk, one or more subsequent modifications to the physical disk until the physical machine becomes unavailable.

If, at step 510 it is determined that the physical machine is unavailable (option "YES") then the method 500 proceeds to step 514. At step 514, a virtual machine is operated in response to unavailability of the physical machine. In some embodiments, a user may operate the virtual machine after a failure renders the physical machine unavailable. The recovery module cooperates with the virtualization module (e.g., the virtualization module 310 of FIG. 3) to mount a virtual machine image and run the virtual machine. The recovery module may utilize a physical to virtual component (e.g., the physical to virtual component 314 of FIG. 3) to create a bootable virtual disk that represents a clone of the physical machine.

At step 516, the virtual disk is monitored. In one embodiment, a data change module running in the virtual machine monitors the virtual disk to identify one or more changed data blocks. As described in the present disclosure, the virtual machine may be a clone of the physical machine and, accordingly, includes the data change module. At step 518, a determination is made as to whether the physical machine is to be recovered. In some embodiments, the virtual machine communicates message data instructing the recovery module to recover the physical machine. Alternatively, the recovery module may select another physical machine for restoring the physical disk.

If, it is determined that the physical machine is not to be recovered (option "NO) then the method 500 proceeds to step 522. For example, the physical machine cannot be recovered if failures that keep the physical machine unavailable persist. At step 522, the method 500 waits. In some embodiments, the recovery module waits until the physical machine resumes functionality. If, at step 518, it is determined that the physical machine is to be recovered (option "YES") then the method 500 proceeds to step 520. At step 520, the virtual machine is migrated to the physical machine. In some embodiments, modifications to the virtual disk are replicated on the physical disk after the physical machine becomes available again. In one embodiment, the consolidation module cooperates with the replay module to replicate such modifications on to the physical disk.

At step 524, a determination is made as to whether the physical machine is available. In some embodiments, the physical machine resumes regular heartbeat data communications to the recovery module. If, it is determined that the physical machine is not available (option "NO") then the method 500 proceeds to step 526. At step 526, the method 500 waits. In some embodiments, the recovery module waits until the physical machine communicates the heartbeat data. If, at step 524 it is determined that the physical machine is available (option "YES"), then the method 500 proceeds to step 528.

At step 528, the virtual machine is terminated. In some embodiments, the recovery module instructs the virtualization module to power down the virtual machine. At step 530, delta modifications to the virtual disk are replicated on the physical disk and the method 500 proceeds to step 532. In some embodiments, the recovery module processes the heartbeat data and determines that the physical machine is available. Then, the recovery module instructs the consolidation module to identify one or more changed data blocks after the migration of the virtual machine. The consolidation module may communicate information associated with the one or more changed data blocks to the data change module running within the physical machine, which replays the one or more changed data blocks on the physical disk. At step 532, the method 500 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method comprising:
 initiating a recovery of a physical machine, wherein
  the recovery of the physical machine comprises
   migrating a virtual machine to the physical machine,
  the physical machine comprises a physical disk, and
  the virtual machine comprises a virtual disk; and
 after the initiating, identifying one or more modifications to data stored in the virtual disk, wherein
  the one or more modifications are made to data stored in the virtual disk after the migrating has been initiated and before the migrating has completed.

2. The method of claim 1, further comprising:
 detecting that the physical machine is available, wherein
  the detecting is performed by monitoring heartbeat data,
  the heartbeat data indicates availability of the physical machine, and
  the initiating is performed in response to the detecting; and
 determining that the physical machine is to be recovered.

3. The method of claim 1, further comprising:
 consolidating the virtual disk and the physical disk by replicating the one or more modifications on the physical disk.

4. The method of claim 1, further comprising:
 terminating the virtual machine.

5. The method of claim 1, further comprising:
 monitoring the data stored in the virtual disk.

6. The method of claim 1, wherein the recovery of the physical disk restores the physical machine to a current state associated with the virtual disk.

7. The method of claim 1, further comprising:
 recovering the physical machine using a bootable virtual disk, wherein
  the bootable virtual disk is installed on the physical machine.

8. A computer-readable storage medium comprising instructions executable to:
 initiate a recovery of a physical machine, wherein
  the recovery of the physical machine comprises
   migrating a virtual machine to the physical machine,
  the physical machine comprises a physical disk, and the virtual machine comprises a virtual disk; and
identify one or more modifications to data stored in the virtual disk, after the recovery of the physical machine has been initiated, wherein
the one or more modifications are made to data stored in the virtual disk after the migrating has been initiated and before the migrating has completed.

9. The computer-executable storage medium of claim 8, wherein the instructions are further executable to:
detect that the physical machine is available, wherein
the detecting is performed by monitoring heartbeat data,
the heartbeat data indicates availability of the physical machine, and
the initiating is performed in response to the detecting; and
determine that the physical machine is to be recovered.

10. The computer-executable storage medium of claim 8, wherein the instructions are further executable to:
consolidate the virtual disk and the physical disk by replicating the one or more modifications on the physical disk.

11. The computer-executable storage medium of claim 8, wherein the instructions are further executable to:
terminate the virtual machine.

12. The computer-executable storage medium of claim 8, wherein the instructions are further executable to:
monitor the data stored in the virtual disk.

13. The computer-executable storage medium of claim 8, wherein the recovery of the physical disk restores the physical machine to a current state associated with the virtual disk.

14. The computer-executable storage medium of claim 8, wherein the instructions are further executable to:
recover the physical machine using a bootable virtual disk, wherein
the bootable virtual disk is installed on the physical machine.

15. A system comprising:
one or more processors;
memory coupled to the one or more processors, wherein the memory stores program instructions executable by the one or more processors to:
initiate a recovery of a physical machine, wherein
the recovery of the physical machine comprises migrating a virtual machine to the physical machine,
the physical machine comprises a physical disk, and
the virtual machine comprises a virtual disk; and
identify one or more modifications to data stored in the virtual disk, after the recovery of the physical machine has been initiated, wherein
the one or more modifications are made to data stored in the virtual disk after the migrating has been initiated and before the migrating has completed.

16. The system of claim 15, wherein the program instructions are further executable to:
detect that the physical machine is available, wherein
the detecting is performed by monitoring heartbeat data,
the heartbeat data indicates availability of the physical machine, and
the initiating is performed in response to the detecting; and
determine that the physical machine is to be recovered.

17. The system of claim 15, wherein the program instructions are further executable to:
consolidate the virtual disk and the physical disk by replicating the one or more modifications on the physical disk.

18. The system of claim 15, wherein the program instructions are further executable to:
monitor the data stored in the virtual disk.

19. The system of claim 15, wherein the recovery of the physical disk restores the physical machine to a current state associated with the virtual disk.

20. The system of claim 15, wherein the program instructions are further executable to:
recover the physical machine using a bootable virtual disk, wherein
the bootable virtual disk is installed on the physical machine.

* * * * *